UNITED STATES PATENT OFFICE.

FRANK A. BARNES, OF BOONE, IOWA.

STOCK FOOD.

1,033,860.  Specification of Letters Patent.  Patented July 30, 1912.

No Drawing.  Application filed March 21, 1910.  Serial No. 550,725.

*To all whom it may concern:*

Be it known that I, FRANK A. BARNES, a citizen of the United States, residing at Boone, in the county of Boone and State of Iowa, have invented certain new and useful Improvements in Stock Foods, of which the following is a specification.

This invention relates to a food compound and more particularly to a stock food and has for its object to increase the nutritive value of stock foods.

Another object is to provide a stock food consisting of a number of ingredients having a high percentage of albumen whereby the food value of the compound is considerably greater than that of other stock foods heretofore known, while at the same time the cost of the food is not increased to any material extent.

With these and other objects in view my invention consists of the following ingredients mixed in substantially the proportions set forth:—In order to provide 100 pounds of the food 37½ pounds of linseed meal, 37½ pounds of wheat middlings, 12½ pounds of peanut meal, and 12½ pounds of cocoanut meal are mixed together.

A stock food composed of the above named ingredients mixed in substantially the proportions specified have been found very beneficial in the production of muscle, fat and energy in cows, horses, hogs, sheep and other cattle. It is also adapted to be fed to fowls and will materially increase the production of eggs. The nutritive properties of the food, viz. the protein, fats and oils are contained in the food in their most condensed form. The cost of the compound is, however, less than that of the majority of stock foods.

I have found that by thus combining the peanut meal and cocoanut meal with the linseed meal and wheat middlings, the nutritive properties of the resultant compound is materially increased and that the cattle thrive upon the same. The chemical analysis of the compound has determined that the same contains 25% protein and 7% of fats and oils.

While the cocoanut meal and the peanut meal are used in the same proportion and preferably constitute together 25% of the entire food, it will be understood that these proportions are susceptible of considerable variation without affecting to any material extent the food properties of the compound.

Buckwheat middlings, corn, oil cake or cotton seed meal, and the admixture therewith of 25% of peanut meal and cocoanut meal in equal parts has also been found to be productive of good results.

Having thus described the invention what is claimed as new is:—

1. A stock food containing substantially 25% of peanut meal and cocoanut meal in substantially equal proportions.

2. A stock food comprising a mixture of substantially 12½ pounds each of peanut meal and cocoanut meal with substantially 37½ pounds each of linseed meal and wheat middlings.

In testimony whereof I hereunto affix my signature in the presence of two witnesses.

FRANK A. BARNES.

Witnesses:
 JAMES BIRD,
 FRED M. KOPPENHAVER.